United States Patent

Morimura et al.

(10) Patent No.: US 10,589,673 B2
(45) Date of Patent: Mar. 17, 2020

(54) IN-VEHICLE ALERT DEVICE

(71) Applicant: Toyota Jidosha Kabushiki Kaisha, Toyota-shi, Aichi-ken (JP)

(72) Inventors: Junichi Morimura, Shizuoka-ken (JP); Takahiko Murano, Shizuoka-ken (JP); Teppei Ohta, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 18 days.

(21) Appl. No.: 15/422,069

(22) Filed: Feb. 1, 2017

(65) Prior Publication Data

US 2017/0225617 A1 Aug. 10, 2017

(30) Foreign Application Priority Data

Feb. 4, 2016 (JP) .................... 2016-019494

(51) Int. Cl.
*B60Q 9/00* (2006.01)
*G06K 9/00* (2006.01)
*G09G 5/00* (2006.01)

(52) U.S. Cl.
CPC ......... *B60Q 9/008* (2013.01); *G06K 9/00362* (2013.01); *G09G 5/003* (2013.01); *G06K 9/00805* (2013.01); *G09G 2354/00* (2013.01); *G09G 2380/10* (2013.01)

(58) Field of Classification Search
CPC ............. G09G 5/003; G09G 2354/00; G09G 2380/10; G06K 9/00805; B60Q 9/008
USPC ........................................................ 701/301
See application file for complete search history.

(56) References Cited

U.S. PATENT DOCUMENTS

| 7,729,858 B2 * | 6/2010 | Koike ................... B60W 30/08 340/436 |
| 8,503,729 B2 * | 8/2013 | Kumagai ................. G06T 7/55 348/118 |
| 2009/0140845 A1 * | 6/2009 | Hioki .................... B60K 35/00 340/425.5 |
| 2012/0320212 A1 * | 12/2012 | Aimura .................... B60R 1/00 348/148 |

(Continued)

FOREIGN PATENT DOCUMENTS

| JP | 0761257 A | 3/1995 |
| JP | 08169288 A | 7/1996 |

(Continued)

*Primary Examiner* — Lail A Kleinman
*Assistant Examiner* — Mahmoud M Kazimi
(74) *Attorney, Agent, or Firm* — Dinsmore & Shohl LLP

(57) ABSTRACT

An in-vehicle alert device includes: an alert object detection device; a display apparatus; and a control device configured to: cause the display apparatus to display a first display when an alert object is detected in a first direction, the first display guiding a line of sight of a driver toward the first direction, cause the display apparatus to display a second display when the alert object is detected in a second direction that is different from the first direction, the second display guiding the line of sight of the driver toward the second direction, and cause the display apparatus to display a third display when the alert object is detected in both the first direction and the second direction, the third display prompting the driver to pay attention over a whole vehicle-width direction in a host vehicle traveling direction.

6 Claims, 5 Drawing Sheets

(56) References Cited

U.S. PATENT DOCUMENTS

| | | | |
|---|---|---|---|
| 2014/0347470 A1* | 11/2014 | Zhang | B60R 1/00 348/118 |
| 2017/0305342 A1* | 10/2017 | Tomioka | B60R 1/00 |
| 2018/0032824 A1* | 2/2018 | Yamamoto | G06K 9/00805 |

FOREIGN PATENT DOCUMENTS

| | | | |
|---|---|---|---|
| JP | 2013203103 A | * | 10/2013 |
| JP | 2013203103 A | * | 10/2013 |

* cited by examiner

IN-VEHICLE ALERT DEVICE

CROSS-REFERENCE TO RELATED APPLICATIONS

This application claims priority to Japanese Patent Application No. 2016-019494 filed on Feb. 4, 2016 which is incorporated herein by reference in its entirety including the specification, drawings and abstract.

BACKGROUND

1. Field of the Disclosure

The present disclosure relates to an in-vehicle alert device that alerts a driver with the use of a display apparatus when an alert object, to which the driver must be alert, is detected around a host vehicle.

2. Description of Related Art

As proposed in Japanese Patent Application Publication No. 7-61257 (JP 7-61257 A), a device is known that displays the virtual image of an obstacle on a head-up display (HUD) to alert the driver when an obstacle, such as a pedestrian, is detected ahead of the host vehicle. This device detects the direction of the line of sight of the driver, detects the frequency with which the line of sight of the driver is directed to the virtual image of an obstacle and, according to the detected frequency, changes the brightness level of the virtual image of the obstacle.

The device described above uses the whole windshield as the HUD display screen. When such a large display area is not reserved, an icon such as an arrow indicating the direction in which the obstacle is present is displayed to guide the line of sight of the driver toward the direction in which the obstacle is present.

However, when obstacles are detected in a plurality of directions and, as a result, the directions, each indicating the direction in which an obstacle is present, are displayed at the same time, there is a possibility that the alert to the driver is not appropriate.

SUMMARY

The present disclosure provides an in-vehicle alert device that displays an alert appropriately when obstacles are detected in a plurality of directions.

The aspect of the present disclosure is an in-vehicle alert device including: an alert object detection device configured to detect an alert object and determine a direction in which the alert object is present; a display apparatus; and a control device that includes a CPU and performs control based on an operation by the CPU, the control device being configured to: cause the display apparatus to display a first display when the alert object is detected in a first direction, the first display guiding a line of sight of a driver toward the first direction, cause the display apparatus to display a second display when the alert object is detected in a second direction that is different from the first direction, the second display guiding the line of sight of the driver toward the second direction, and cause the display apparatus to display a third display when the alert object is detected in both the first direction and the second direction, the third display prompting the driver to pay attention over a whole vehicle-width direction in a host vehicle traveling direction.

The aspect described above can display an alert appropriately to alert the driver appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A1 is a diagram showing an icon displayed on a display apparatus;

FIG. 4A2 is a diagram showing an icon displayed on the display apparatus;

FIG. 4B1 is a diagram showing an icon displayed on the display apparatus;

FIG. 4B2 is a diagram showing an icon displayed on the display apparatus;

DETAILED DESCRIPTION OF EMBODIMENTS

Figure 1:
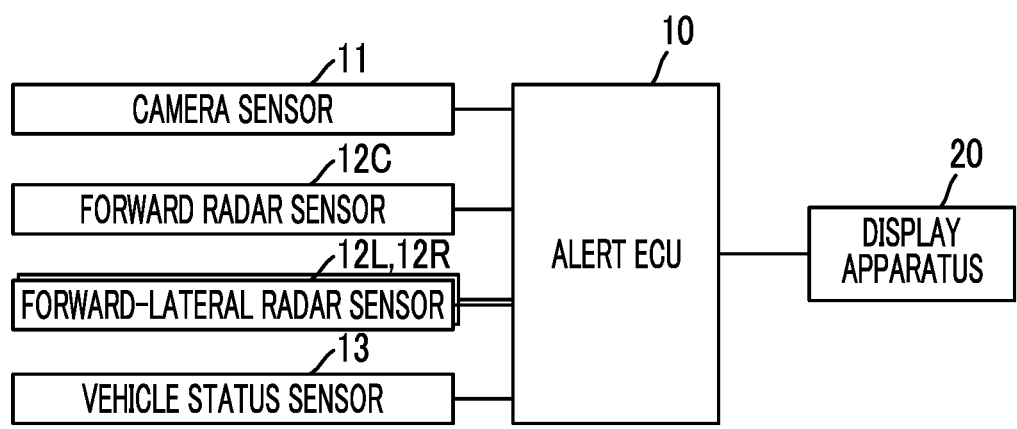
FIG. 1 is a general system configuration diagram showing an in-vehicle alert device in this embodiment.

An embodiment of the present disclosure is described in detail below with reference to the drawings. FIG. 1 is a general system configuration diagram showing an in-vehicle alert device in this embodiment.

The in-vehicle alert device includes an alert ECU 10 having a microcomputer as its main component. ECU is an abbreviation for Electronic Control Unit. In this specification, the microcomputer includes a CPU and storage devices such as an ROM and an RAM. The CPU implements various functions by executing the instructions (program) stored in the ROM. When it is necessary to distinguish the vehicle, on which the in-vehicle alert device is mounted, from other vehicles, the vehicle is referred to as a "host vehicle".

The alert ECU 10 is connected to a camera sensor 11, a forward radar sensor 12C, forward-lateral radar sensors 12L and 12R, a vehicle status sensor 13, and a display apparatus 20. The camera sensor 11 includes, for example, a vehicle-mounted stereo camera for photographing the area ahead of the host vehicle and an image processing device for processing the images captured by the vehicle-mounted stereo camera (these are not shown). The camera sensor 11 uses the image processing device to determine whether there is an obstacle in the imaging area. If there is an obstacle, the camera sensor 11 calculates the position of the obstacle and, at the same time, determines the type of the obstacle (pedestrian, motorcycle, automobile, etc.). The position of an obstacle is identified by the direction of the obstacle with respect to, and the distance from, the host vehicle. The camera sensor 11 sends information, which indicates the position of an obstacle and the type of the obstacle, to the alert ECU 10 at a predetermined short periodic interval. Therefore, the alert ECU 10 can check a change in the information on the obstacle to get information on the relative speed and the relative movement trajectory of the obstacle with respect to the host vehicle.

Figure 2:
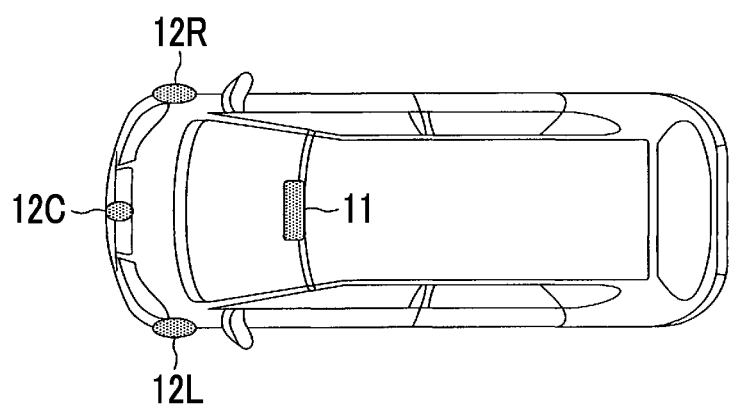
FIG. 2 is a top view showing the installation positions of radar sensors and a camera sensor.

Each of the forward radar sensor 12C and the forward-lateral radar sensors 12L and 12R sends a radio wave in the millimeter-wave band (referred to as a millimeter wave). If there is an object (obstacle) that reflects the millimeter wave within the range in which the millimeter wave is sent, the reflected wave is used to detect the distance between the host vehicle and the obstacle and the direction of the obstacle with respect to the host vehicle. As shown in FIG. 2, the forward radar sensor 12C is provided in the center of the vehicle width direction of the host vehicle front bumper, the forward-lateral radar sensor 12R is provided at the right corner of the host vehicle front bumper, and the forward-lateral radar sensor 12L is provided at the left corner of the host vehicle front bumper. In the description below, the forward radar sensor 12C and the forward-lateral radar sensors 12L and 12R are referred to collectively as radar sensors 12.

Figure 3:
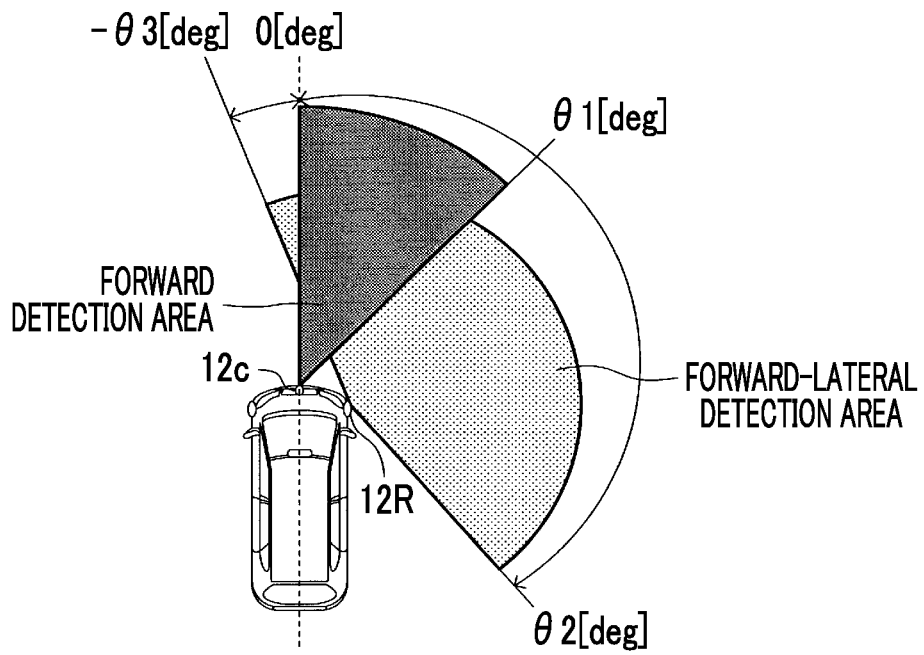
FIG. 3 is a top view showing the detection areas of the radar sensors.
Figure 3:
Figure 3:
Figure 3:
Figure 3:

As shown in FIG. 3, the detection area of the forward radar sensor 12C is the range that is ±θ1 degrees (0 degree<θ1<90 degrees) in the left and right directions from the vehicle longitudinal axis (the forward direction is 0 degree) (In FIG. 3, the range in the left direction is omitted). Therefore, the forward radar sensor 12C primarily detects an obstacle ahead of the host vehicle. On the other hand, the detection area of the forward-lateral radar sensor 12R is the range that is θ2 degrees (90 degrees<θ2<180 degrees) in the right direction, and −θ3 degrees (0 degree<θ3<90 degrees) in the left direction, from the vehicle longitudinal axis. Therefore, the forward-lateral radar sensor 12R primarily detects an obstacle in the right lateral direction of the host vehicle. Although not shown, the detection area of the forward-lateral radar sensor 12L is the area horizontally symmetric to the detection area of the forward-lateral radar sensor 12R with the vehicle longitudinal axis as the axis of symmetry. Therefore, the forward-lateral radar sensor 12L primarily detects an obstacle in the left lateral direction of the host vehicle. The detection distance of each of the radar sensors 12C, 12L, and 12R is, for example, several tens of meters. Each of the radar sensors 12C, 12L, and 12R sends the position information on a detected obstacle (the distance between the host vehicle and the obstacle, the direction of the obstacle with respect to the host vehicle) to the alert ECU 10 at a predetermined short cyclic interval. Therefore, the alert ECU 10 can check a change in the information on the obstacle to get information on the relative speed and the movement trajectory of the obstacle with respect to host vehicle of the obstacle.

In the description below, the information on an obstacle detected by the camera sensor 11 and the radar sensor 12 is referred to as target information.

The vehicle status sensor 13 is a sensor that acquires the vehicle status information necessary for estimating the traveling course of the host vehicle. The vehicle status sensor 13 includes, for example, a vehicle speed sensor that detects the vehicle body speed, an acceleration sensor that detects the horizontal acceleration of the vehicle body, a yaw rate sensor that detects the yaw rate of the vehicle body, and a steering angle sensor that detects the steering angle of the steering wheel. The alert ECU 10 receives the vehicle status information from the vehicle status sensor 13 at a predetermined short cyclic interval. For example, the alert ECU 10 calculates the turning radius of the host vehicle based on the vehicle speed detected by the vehicle speed sensor and the yaw rate detected by the yaw rate sensor and, based on the calculated turning radius, estimates an (arc-shaped) traveling course for which the host vehicle is heading. When the yaw rate is zero, the alert ECU 10 estimates the straight-line course along the direction of acceleration, which is detected by the acceleration sensor, as the traveling course for which the host vehicle is heading.

The display apparatus 20 is, for example, a head-up display (hereinafter, referred to as an HUD). The HUD receives display information from the various ECUs in the host vehicle and from the navigation device and projects the received display information in a partial area (display area) on the windshield of the host vehicle. When an alert object that will be described later is detected, the alert ECU 10 sends alert display information to the HUD. This allows the HUD to displays an alert icon using a part of the display area.

The display apparatus 20 is not limited to an HUD but may be a meter display or the touch panel of the navigation device. The meter display is a display panel composed of a collection of meters (a speedometer, a tachometer, a fuel gauge, a coolant temperature gauge, an odometer, a trip meter, and a warning lamp) and arranged on the dashboard.

Next, the alert ECU 10 is described. The alert ECU 10 extracts an obstacle that is likely to collide with the host vehicle, based on the target information acquired from the camera sensor 11 and the radar sensors 12. When the degree of necessity to inform the driver about the obstacle exceeds the reference value, the alert ECU 10 identifies the obstacle as an alert object and alerts the driver using the display apparatus 20. For example, the alert ECU 10 predicts the traveling course of the host vehicle based on the vehicle status information on the host vehicle. At the same time, based on the relative relation between the host vehicle and the obstacle (relative position, relative speed, and its change), the alert ECU 10 extracts an obstacle that is in the predicted traveling course of the host vehicle and an obstacle that is predicted to enter the predicted traveling course.

In this case, for the detection area of the forward radar sensor 12C, the alert ECU 10 extracts only pedestrians by referencing the information determined by the camera sensor 11. For the detection area of the forward-lateral radar sensors 12L and 12R that does not include the detection area of the forward radar sensor 12C, the alert ECU 10 extracts all obstacles, both pedestrians and automobiles, that are predicted to enter the predicted traveling route. For example, when the host vehicle is going to enter an intersection, the alert ECU 10 extracts the obstacles that are going to enter the intersection from the lateral directions. Therefore, the alert ECU 10 extracts the pedestrians that exist ahead of the host vehicle and the moving objects that are approaching the predicted traveling course in such a manner that they are going to intersect the predicted travel course of the host vehicle from the lateral directions of the host vehicle.

If an obstacle is extracted, the alert ECU 10 calculates the time to collision T that indicates the predicted length of time from the current time to the time at which the host vehicle is predicted to collide with the obstacle. The time to collision T is calculated assuming that the obstacle will travel while maintaining the current traveling speed. The time to collision T can be calculated, for example, by dividing the relative distance between the host vehicle and the obstacle by the relative speed between the host vehicle and the obstacle.

The alert ECU 10 repeatedly calculates the time to collision T of each obstacle at a predetermined short cyclic interval. The alert ECU 10 identifies an obstacle whose time to collision T is shorter than the reference value T1 as an alert object and alerts the driver to the obstacle using the display apparatus 20. This time to collision T is a parameter that indicates the time allowance necessary for the driver to perform an operation to prevent the host vehicle from colliding with the alert object, that is, a parameter that represents the emergency degree, and corresponds to the alert requirement degree in the present disclosure. If an obstacle is identified as an alert object but if, at a later time, the time to collision T becomes equal to or greater than the reference value T1, the alert ECU 10 cancels the setup of the alert object.

If an alert object is detected, the alert ECU 10 causes the display apparatus 20 to display an icon i1, such as the one shown in FIG. 4A1 or FIG. 4A2, that indicates the direction in which the alert object is present. A plurality of icons i1 is available so that a plurality of directions in which alert objects are present can be indicated. The alert ECU 10 selects the icon i1 pointing to the direction closest to the direction in which the alert object is present and causes the display apparatus 20 to display the selected icon i1. In this example, FIG. 4A 1 shows the icon i1 that is displayed when an alert object is present in an area slightly left ahead, and FIG. 4A2 shows the icon i1 that is displayed when an alert object is present in an area slightly right ahead. Therefore, the line of sight of the driver can be guided toward the direction pointed to by this icon i1.

For an alert object that is detected in the range extending ahead of the driver's eye point with a predetermined angle (for example, ±7 degrees) in the right and left directions, the alert ECU 10 displays the icon i1 shown in FIG. 4A1 or FIG. 4A2. For an alert object that is detected in the areas laterally outside of that range, the alert ECU 10 displays an icon i2 shown in FIG. 4B1 or FIG. 4B2. This icon i2 indicates that an alert object is present in the lateral direction and that the alert object is moving in the indicated direction. In this example, FIG. 4B1 shows that there is an obstacle moving from the left lateral direction of the host vehicle in such a manner that the obstacle will intersect the travel course of the host vehicle. FIG. 4B2 shows that there is an obstacle moving from the right lateral direction of the host vehicle in such a manner that the obstacle will intersect the travel course of the host vehicle. Therefore, the display of the icon i2 allows the driver to recognize the movement of an obstacle that is approaching the host vehicle. According to the human vision, an object outside the range with a predetermined angle described above (e.g., ±7 degrees) is perceived as an object that is present in the lateral direction. Therefore, for an alert object outside the range with a predetermined angle (e.g., ±7 degrees), displaying the icon i2 in this way allows the line of sight of the driver to be be guided toward the direction in which the alert object is present.

Figure 4C:
FIG. 4C is a diagram showing an icon displayed on the display apparatus.

In the meantime, the number of alert objects is not always one. For example, in some cases, a plurality of alert objects is detected over the whole area from left to right ahead of (including the laterally ahead of) the host vehicle. Considering such a case, an icon i3, such as the one shown in FIG. 4C, is available for use to help the driver to pay attention to the whole area over the vehicle width direction ahead of the host vehicle. The alert ECU 10 displays this icon i3 according to the circumstances. This icon allows the driver to stay aware of obstacles over the whole area, not in a specific direction.

Figure 5A:
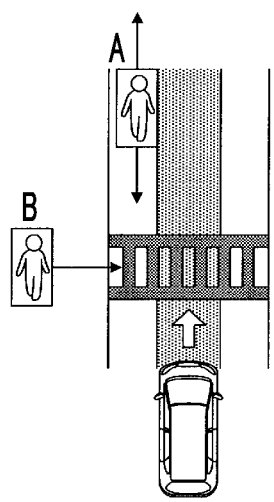
FIG. 5A is a top view showing the positional relationship between a host vehicle and alert objects.

In the meantime, a plurality of alert objects is detected in some cases on one of the left and right sides in a large-angle range as shown in FIG. 5A. In the example in FIG. 5A, pedestrian A is detected in the left forward direction and pedestrians B, who is moving and approaching the predicted traveling course of host vehicle, is detected in the left lateral direction. In such circumstances, if the two icons—one is the icon i1 (FIG. 4A1) pointing to the alert object detected in the left forward direction and the other is the icon i2 (FIG. 4B1) pointing to the alert object detected in the left lateral direction—are displayed at the same time in an overlapping manner, the driver finds it difficult to view, and feels annoyed about, the display. A similar problem arises also when two or more icons i1 that are of the same type but point to different directions are displayed at the same time.

To solve this problem, when a plurality of alert objects is detected on one of the left side and the right side, the alert ECU 10 selects one of them and causes the display apparatus 20 to display the icon i1 or the icon i2 corresponding to the selected alert object.

Figure 5B:
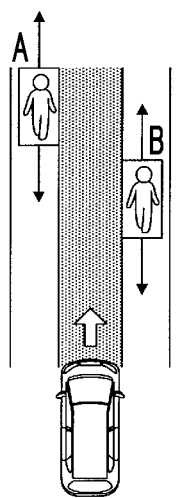
FIG. 5B is a top view showing the positional relationship between the host vehicle and alert objects.
Figure 5C:
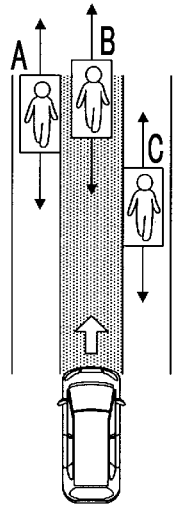
FIG. 5C is a top view showing the positional relationship between the host vehicle and alert objects.

In addition, when a plurality of alert objects is detected over the whole area in the left and right directions as shown in FIG. 5B and FIG. 5C (pedestrians A and B in the example in FIG. 5B, and pedestrians A, B, and C in the example of FIG. 5C), it is sometimes better to prompt the driver to pay attention to a particular alert object, rather than to display the icon i3 shown in FIG. 4C, depending upon the circumstances.

Considering these cases, the alert ECU 10 switches the icon, which is displayed on the display apparatus 20, from one to another depending upon the circumstances, that is, switches the object, to which the driver should be alert, from one to another.

Figure 6:
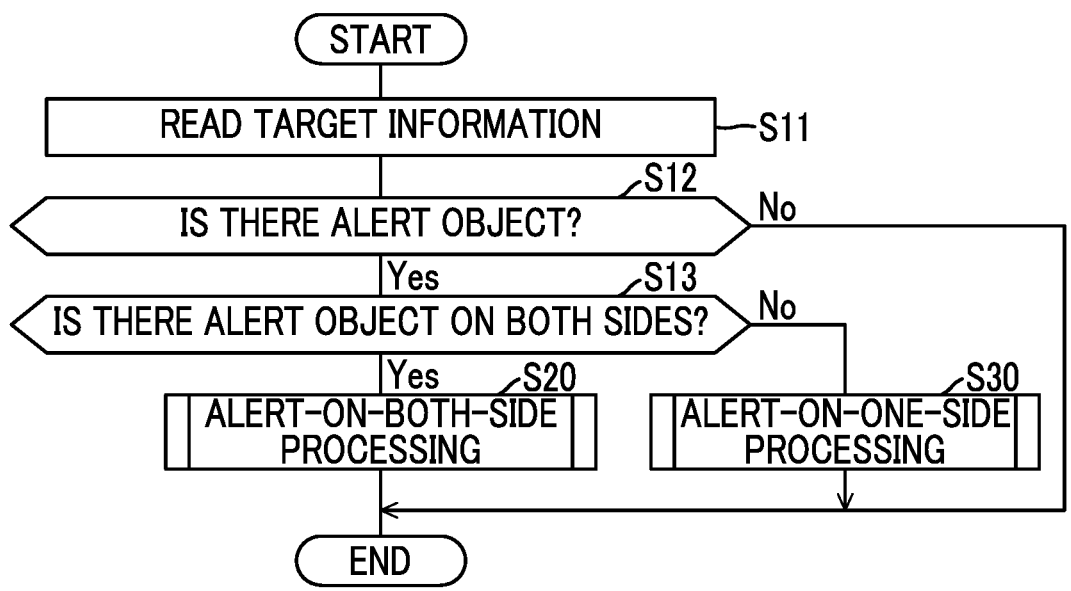
FIG. 6 is a flowchart showing an alert main control routine.
Figure 7:
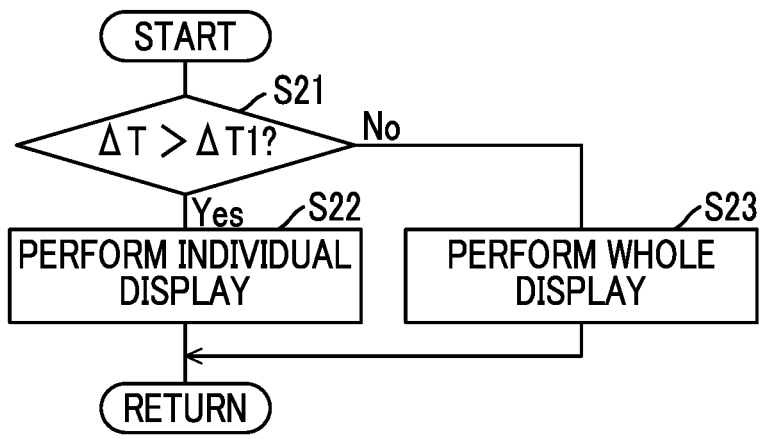
FIG. 7 is a flowchart showing an alert-on-both-side subroutine.
Figure 8:
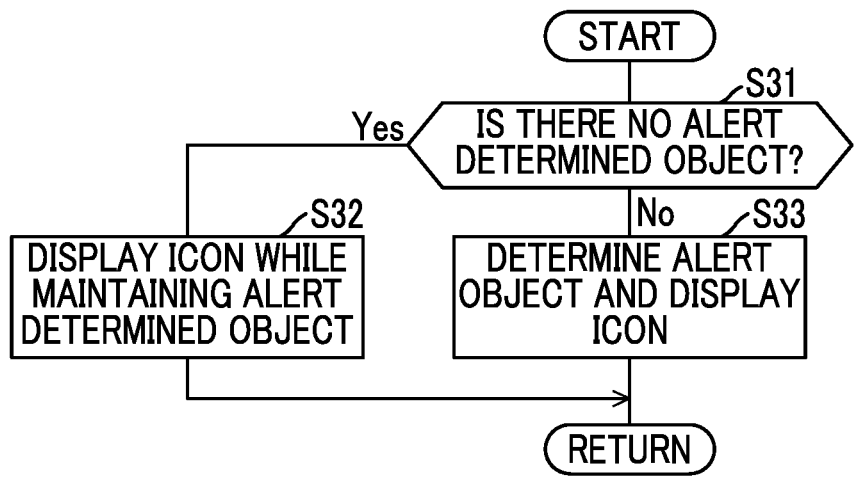
FIG. 8 is a flowchart showing an alert-on-one-side subroutine.

FIG. 6 to FIG. 8 show the control processing performed by the alert ECU 10. FIG. 6 shows the alert main control routine, FIG. 7 shows the alert-on-both-side subroutine, and FIG. 8 shows the alert-on-one-side subroutine.

First, the alert main control routine (FIG. 6) is described. The alert ECU 10 performs the alert main control routine (including the subroutines) at a predetermined short operation cyclic interval in the period during which the vehicle travels at a speed equal to or higher than the predetermined vehicle speed that is set in advance.

When this routine is started, the alert ECU 10 reads the target information, sent from the camera sensor 11 and the radar sensor 12, in step S11 and, in step S12, determines whether there is an alert object. In this case, the alert ECU 10 calculates the time to collision T for all detected obstacles and determines whether there is an obstacle (i.e., an alert object) whose time to collision T is smaller than the reference value T1. If it is determined that there is no alert object, the alert ECU 10 once terminates the routine.

The alert ECU 10 repeats this processing. If it is determined that there is an alert object, the processing proceeds to step S13 to determine whether there is at least one alert object in each of the left side area and the right side area or whether there is at least one alert object only in one of the left side area and the right side area. For example, the alert ECU 10 divides the area ahead of the host vehicle into the left side area and the right side area (bisects the detection range of the forward radar sensor 12C into the left side area and the right side area) and determines whether there is at least one alert object in each of the left side area and the right side area generated by the division.

If there is at least one alert object in each of the side left area and the right side area, the alert ECU 10 performs the alert-on-both-side subroutine (S20) shown in FIG. 7. If there is at least one alert object only in one of the left side area and the right side area, the alert ECU 10 performs the alert-on-one-side subroutine (S30) shown in FIG. 8. After the alert-on-both-side subroutine or the alert-on-one-side subroutine is performed, the alert ECU 10 once terminates the alert main control routine and, after a predetermined interval (the length of time corresponding to the calculation cycle), restarts the attention main control routine.

First, the alert-on-both-side subroutine (FIG. 7) is described. When the alert-on-both-side subroutine is started, the alert ECU 10 calculates the difference between the times to collision T of each two of a plurality of alert objects (called the time-to-collision difference ΔT) in step S21 and determines whether the time-to-collision difference ΔT is larger than the threshold ΔT1. In this case, if there are two alert objects (one in the right area and the other in the left area), the difference between the times to collision T of the two alert objects is calculated as the time-to-collision difference ΔT. On the other hand, if there are three or more alert objects, the difference between the time to collision T of the alert object, detected in the right area and corresponding to the shortest time to collision T, and the time to collision T of the alert object, detected in the left area and corresponding to the shortest time to collision T, is calculated as the time-to-collision difference ΔT.

If the time-to-collision difference ΔT is larger than the threshold ΔT1 (S21: Yes), the alert ECU 10 performs the individual display in step S22. In other words, the alert ECU 10 displays the icon i1 or the icon i2 that points to the alert object that is one of the alert objects and that corresponds to the shortest time to collision T. In the description below, an alert object that is set as the display target of an icon (more specifically, the alert object pointed to by an icon) is called an alert determined object.

Therefore, the alert object corresponding to the shortest time to collision T becomes the alert determined object. For example, if the alert determined object is an alert object that is present ahead of the host vehicle (within the range of ±7 degrees), the icon i1 is displayed. If the alert determined object is an alert object that is present laterally ahead of the host vehicle (outside the range of ±7 degrees), the icon i2 is displayed.

On the other hand, if the time-to-collision difference ΔT is equal to or smaller than the threshold ΔT1 (S21: No), the alert ECU 10 performs the whole display in step S23. That is, the alert ECU 10 displays the icon i3 as shown in FIG. 4C to prompt the driver to pay attention over the whole vehicle width direction of the area ahead of the host vehicle.

After displaying the icon in step S22 or step S23, the alert ECU 10 once terminates the alert-on-both-side subroutine.

The time to collision T, a parameter indicating the emergency degree for alerting the driver, indicates the alert requirement degree. That is, the shorter the time to collision T is, the higher the alert requirement degree is. For this reason, if the time-to-collision difference ΔT is large, the difference between the alert requirement degrees is large, meaning that in some embodiments the line of sight of the driver be guided toward the direction of a particular alert object corresponding to the higher alert requirement degree. Therefore, in such circumstances, the alert object corresponding to the shortest time to collision T is set as the alert determined object, and one icon i1 (or icons i2) corresponding to the direction of the alert determined object is displayed in step S22. Displaying the icon in this manner allows the driver to recognize the obstacle to which the driver must be most alert, thus helping the driver to properly perform the collision avoidance operation.

On the other hand, if the time-to-collision difference ΔT is small, the difference between the alert requirement degrees is small, meaning that in some embodiments the line of sight of the driver not be guided only toward the direction of a particular alert object, that is, the line of sight of the driver be paid over the whole vehicle width direction ahead of the vehicle. Therefore, in such circumstances, one icon i3 is displayed in step S23. Displaying the icon in this manner allows the driver to pay attention over the whole vehicle width direction ahead of the vehicle.

As described above, if alert objects are detected in both directions (first direction that is the left direction and the second direction that is the right direction), the icon is displayed according to the following criteria. If the difference between the alert requirement degrees of both alert objects exceeds the threshold, the icon (icon i1 or icon i2) is displayed to guide the line of sight of the driver only toward the alert object corresponding to the higher requirement degree. On the other hand, if the difference between the requirement degrees does not exceed the threshold, the icon (icon i3) is displayed to prompt the driver to pay attention over the whole vehicle-width direction in the vehicle traveling direction so that the line of sight of the driver is not guided only toward a particular alert object.

If the difference between the alert requirement degree of an alert object in the right area and that of an alert object in the left area exceeds the threshold and if a plurality of alert objects is detected in the side (right or left) in which the driver musts be alert, the icon (icon i1 or icon i2) is displayed to guide the line of sight of the driver only toward the alert object corresponding to the higher alert requirement degree.

Next, the alert-on-one-side subroutine (FIG. 8) is described. The alert-on-one-side subroutine is performed if alert objects are present only in one of the left side and the right side (S13: No). When the alert-on-one-side subroutine is started, the alert ECU 10 determines in step S31 whether there is no alert determined object. The alert determined object is an alert object that is set as the display target of an icon. Therefore, in this step, the alert ECU 10 determines whether there is an alert object for which the icon i1 (or i2) is displayed to alert the driver. If there is an alert determined object (S31: Yes), the alert ECU 10 maintains the alert determined object in step S32. Therefore, the icon i1 (or i2) is displayed for the same alert determined object as that in the immediately preceding cycle (one cycle before).

On the other hand, if there is no alert determined object (S31: No), the alert ECU 10 passes processing control to step S33. There is no alert determined object in the following cases. In one case, there had been no alert object up to the immediately preceding cycle (one cycle before) and an alert object is detected for the first time at the current calculation time (S12: Yes). In another case, there had been an alert determined object up to the immediately preceding cycle and the alert determined object is removed from the alert objects at the current calculation time (The time to collision T becomes equal to or larger than the reference value T1 and the determination result in step S12 is No.)

In this case, if there is a plurality of alert objects and their directions are different from each other, the alert ECU 10 selects the alert object corresponding to the shortest time to collision T from the alert objects and sets the selected alert object as the alert determined object. Therefore, one icon i1 (or i2) indicating the direction corresponding to the alert determined object, which has been set, is displayed.

After displaying the icon in step S32 or step S33, the alert ECU 10 once terminates the alert-on-one-side subroutine.

Therefore, according to this alert-on-one-side subroutine, if there are one or more alert objects only in one of the left side and the right side, the alert object corresponding to the shortest time to collision T is set as the alert determined object After the alert object is once set as the alert determined object, the icon i1 (or icon i2) for the alert determined object remains displayed while the alert determined object is determined as an alert object. This display appropriately alerts the driver.

According to the in-vehicle alert device of the embodiment described above, when alert objects are detected in a plurality of directions, one icon to be displayed on the display apparatus 20 is set based on the directions in which the alert objects are positioned, the alert requirement degrees (times to collision T), and the difference between the alert requirement degrees (time-to-collision difference $\Delta T$). Thus, an appropriate alert can be given according to the circumstances within the constraints on the display area of the display apparatus 20.

A vehicle on which the in-vehicle alert device in this embodiment is mounted includes not only the in-vehicle alert device but also a collision avoidance assistance device that applies the automatic brake when an obstacle (such as other vehicles) that is likely collide with the host vehicle is detected. Therefore, the in-vehicle alert device detects only pedestrians as its alert objects ahead of the host vehicle while, when an obstacle that is likely to collide with the host vehicle is present ahead of the host vehicle, the collision avoidance assistance device functions to avoid collision with the obstacle.

While the in-vehicle alert device according to this embodiment has been described above, the present disclosure is not limited to the above embodiment but and various modifications are possible.

For example, though the time to collision T is used for the alert requirement degree in this embodiment, the relative speed Vr between the host vehicle and an alert object in the direction in which the host vehicle and the alert object are approaching, or the distance D between the host vehicle and an alert object, may be used for the alert requirement degree instead of the time to collision T. Therefore, in step S12, the alert ECU 10 may recognize an obstacle whose relative speed Vr is larger than the reference value Vr1, or an obstacle whose distance D is shorter than the reference value D1, as an alert object. In addition, in step S22 or in step S33, the alert ECU 10 may set an alert object corresponding to the highest relative speed Vr, or an alert object corresponding to the shortest distance D, as the alert determined object.

In addition, for the difference between the alert requirement degrees for alert objects, the relative speed difference $\Delta Vr$, that is, the difference $\Delta Vr$ between the relative speeds Vr of a plurality of alert objects, may be used instead of the time-to-collision difference $\Delta T$. In this case, in the step S21, the alert ECU 10 may determine whether the relative speed difference $\Delta Vr$ is larger than threshold $\Delta Vr1$. In addition, the distance difference $\Delta D$, that is, the difference $\Delta D$ between the distances D of a plurality of alert objects, may be used instead of the time-to-collision difference $\Delta T$. In this case, in the step S21, the alert ECU 10 may determine whether the distance difference $\Delta D$ is larger than threshold $\Delta D1$.

In this embodiment, if alert objects are detected in both the left direction and the right direction, one of the two types of icon, either an icon that guides the line of sight of the driver toward a particular alert object or an icon that prompts the driver to pay attention over the whole vehicle-width direction in the vehicle traveling direction, is selected based on the difference between the alert requirement degrees (time-to-collision difference $\Delta T$). However, an icon need not always be selected in this way. For example, if alert objects are detected in a plurality of directions, one icon (for example, icon i1 or icon i2) that guides the line of sight of the driver always toward the alert object corresponding to the highest alert requirement degree may be displayed. If alert objects are detected in both the left direction and the right direction, one icon (for example, icon i3) that prompts the driver to always pay attention over the whole vehicle-width direction in the vehicle traveling direction may be displayed.

The icons displayed on the display apparatus 20 may be designed freely.

Out of those detected ahead, only the pedestrians are recognized as alert objects in this embodiment (Motorcycles and automobiles are not included in the alert objects). The alert objects need not necessarily be limited to pedestrians only but may include all obstacles.

The display area of the display apparatus 20 is required to have space large enough to display only one of the icons i1, i2, and i3 shown in FIG. 4. In other words, the display area may have space that is not so large enough to display two or more the icons i1, i2, and i3 at the same time. This embodiment, if implemented by such a display apparatus, makes the display apparatus more compact and, at the same time, allows the small display area to be fully utilized for appropriately guiding the line of sight of the driver.

In the above aspect, as the third display, the control device may be configured to select one of a display that guides the line of sight of the driver only toward one of the first direction and the second direction and a display that prompts the driver to pay attention over the whole vehicle-width direction in the host vehicle traveling direction and to cause the display apparatus to display the selected display.

In the above aspect, the control device may be configured to: calculate an alert requirement degree for the alert object and cause the display apparatus to display, as the third display, a display that guides the line of sight of the driver only toward an alert object when the alert object is detected in the first direction and in the second direction and a difference between a first requirement degree and a second requirement degree is larger than a threshold, the alert object being calculated higher requirement degree, the first requirement degree being the alert requirement degree for the alert object in the first direction, the second requirement degree being the alert requirement degree for the alert object in the second direction and cause the display apparatus to display, as the third display, a display that prompts the driver to pay attention over the whole vehicle-width direction in the host vehicle traveling direction when the alert object is detected in the first direction and in the second direction and the difference between the first requirement degree and the second requirement degree is equal to or smaller than the threshold.

In the above aspect, the control device may be configured to calculate a higher value for the alert requirement degree as a time to collision from a current time to a time at which the host vehicle is predicted to arrive at a position of the alert object is shorter.

In the above aspect, the control device may be configured to calculate a larger value for the alert requirement degree as a distance between the host vehicle and the alert object is shorter.

In the above aspect, the control device may be configured to cause the display apparatus to display one of a first icon corresponding to the first display, a second icon corresponding to the second display, and a third icon corresponding to the third display and the display apparatus may have a display area having space that is not so large enough to display two or more of the first icon, the second icon, and the third icon at the same time.

What is claimed is:

1. An in-vehicle alert device comprising:
an alert object detection device configured to detect an alert object and determine a direction in which the alert object is present;
a display apparatus; and
a control device that includes a central processing unit and performs control based on an operation by the central processing unit, the control device being configured to:
cause the display apparatus to display a first display when the alert object is detected in a first direction, the first display guiding a line of sight of a driver toward the first direction,
cause the display apparatus to display a second display when the alert object is detected in a second direction that is different from the first direction, the second display guiding the line of sight of the driver toward the second direction, and
cause the display apparatus to display a third display when the alert object is detected in both the first direction and the second direction, the third display prompting the driver to pay attention over a whole vehicle-width direction in a host vehicle traveling direction,
wherein the first display, the second display, and the third display are only displayed on a single display of the display apparatus, and wherein:
the control device is configured to cause the display apparatus to display a first icon corresponding to the first display, a second icon corresponding to the second display, and a third icon corresponding to the third display,
the third icon, which is different from the first icon and the second icon, indicates that a plurality of alert objects is detected,
the control device is configured to cause the display apparatus to display the third icon instead of the first icon and the second icon when the alert object is detected in both the first direction and the second direction,
the first direction is a left direction and the second direction is a right direction,
the control device is configured to select one of a display that guides the line of sight of the driver only toward one of the first direction and the second direction and a display that prompts the driver to pay attention over the whole vehicle-width direction in the host vehicle traveling direction and to cause the display apparatus to display the selected display as the third display, and
the control device is configured to:
calculate an alert requirement degree for the alert object and
cause the display apparatus to display, as the third display, a display that guides the line of sight of the driver only toward the alert object when the alert object is detected in the first direction and in the second direction and a difference between a first requirement degree and a second requirement degree is larger than a threshold, the alert object being calculated higher requirement degree, the first requirement degree being the alert requirement degree for the alert object in the first direction, the second requirement degree being the alert requirement degree for the alert object in the second direction and
cause the display apparatus to display, as the third display, a display that prompts the driver to pay attention over the whole vehicle-width direction in the host vehicle traveling direction when the alert object is detected in the first direction and in the second direction and the difference between the first requirement degree and the second requirement degree is equal to or smaller than the threshold.

2. The in-vehicle alert device according to claim 1, wherein
the control device is configured to calculate a higher value for the alert requirement degree as a time to collision is shorter, control device is configured to calculate the time to collision as a period from a current time to a time at which the host vehicle is predicted to arrive at a position of the alert object.

3. The in-vehicle alert device according to claim 1, wherein
the control device is configured to calculate a larger value for the alert requirement degree as a relative speed between the host vehicle and the alert object in a direction, in which the host vehicle and the alert object will approach, is higher.

4. The in-vehicle alert device according to claim 1, wherein
the control device is configured to calculate a larger value for the alert requirement degree as a distance between the host vehicle and the alert object is shorter.

5. The in-vehicle alert device according to claim 1, wherein
the display apparatus has a display area having space that is not large enough to display two or more of the first icon, the second icon, and the third icon at the same time.

6. The in-vehicle alert device according to claim 2, wherein
when there are three or more alert objects, a time-to-collision difference is calculated as a difference between a time to collision of the alert object, detected in a right side area and corresponding to a shortest time to collision, and a time to collision of the alert object, detected in a left side area and corresponding to the shortest time to collision.

* * * * *

UNITED STATES PATENT AND TRADEMARK OFFICE
CERTIFICATE OF CORRECTION

PATENT NO.         : 10,589,673 B2
APPLICATION NO.    : 15/422069
DATED              : March 17, 2020
INVENTOR(S)        : Junichi Morimura, Takahiko Murano and Teppei Ohta It is certified that error appears in the above-identified patent and that said Letters Patent is hereby corrected as shown below:

On the Title Page

Item (72), inventors, address, delete "Susono" and insert --Shizuoka-ken--, therefor.

In the Specification

In Column 1, Line 35, delete "arc" and insert --are--, therefor.

In Column 3, Line 28, before "degrees", delete "02" and insert --$\theta 2$--, therefor.

In Column 3, Line 28, after "90 degrees<", delete "02" and insert --$\theta 2$--, therefor.

Signed and Sealed this
Nineteenth Day of May, 2020

Andrei Iancu
*Director of the United States Patent and Trademark Office*